United States Patent [19]
Premji

[11] Patent Number: 5,481,941
[45] Date of Patent: Jan. 9, 1996

[54] INFINITELY ADJUSTABLE TRACK LOCKING MECHANISM

[75] Inventor: Gulam Premji, Mississauga, Canada

[73] Assignee: Bertrand Faure Ltd., Mississauga, Canada

[21] Appl. No.: 351,958

[22] Filed: Dec. 8, 1994

[30] Foreign Application Priority Data

Aug. 19, 1994 [CA] Canada ................................ 2130497

[51] Int. Cl.⁶ ........................................ G05G 5/16
[52] U.S. Cl. ........................ 74/531; 297/375; 248/430
[58] Field of Search ....................... 74/531; 188/67; 297/375; 248/424, 429, 430

[56] References Cited

U.S. PATENT DOCUMENTS

| | | | |
|---|---|---|---|
| 3,793,903 | 2/1974 | Pellman | 188/67 |
| 4,738,156 | 4/1988 | Pipon et al. | 74/531 |
| 4,846,526 | 7/1989 | Allen | 297/378 |
| 5,183,236 | 2/1993 | Droulon | 254/95 |
| 5,265,936 | 11/1993 | Droulon et al. | 297/361.1 |

FOREIGN PATENT DOCUMENTS

2096854  7/1992  Canada .

Primary Examiner—Rodney H. Bonck
Assistant Examiner—Chong H. Kim
Attorney, Agent, or Firm—Partick J. Hofbauer

[57] ABSTRACT

A mechanism for selectively locking a stationary element and a movable element mounted on the stationary element. The mechanism comprises a pawl block mounted within a casing for sliding movement in opposite first and second directions along a first axis substantially transverse to an engagement surface on the stationary element. The pawl block has a substantially "V"-shaped cavity defined by two ramp surfaces which, together with the engagement surface, define a substantially triangular recess. A striated roller member is mounted within the recess for simultaneous circumferential engagement with the engagement surface and at least one of the inclined ramp surfaces when the pawl block is in its locking configuration. A wedge block is movable in opposite third and fourth directions along a second axis generally transverse to the first axis, between a blocking position, whereat the wedge block wedgingly engages the pawl block into the locking configuration, and a withdrawn position, whereat the wedge block is removed from such wedging engagement so as to permit movement of the pawl block from the locking configuration to an unlocked configuration.

17 Claims, 4 Drawing Sheets

FIG.6.

INFINITELY ADJUSTABLE TRACK LOCKING MECHANISM

FIELD OF THE INVENTION

The present invention relates to manually operated mechanisms for selectively locking in infinitely adjustable relation to each other, a stationary element and a movable element co-operatively mounted on the stationary element, and more particularly to manually operated vehicle seat track slides having at least one stationary track member and one movable track member to be selectively locked in infinitely adjustable relation to each other.

BACKGROUND OF THE INVENTION

Many manually adjustable prior art vehicle seats have incrementally adjustable vehicle seat track members on which the entire seat assembly slides between a plurality of discrete fore and aft positions, wherein two track members are locked in place with respect to each other by a separate external locking means having teeth that protrude into aligned apertures in one or both of the two track members. There are, however, numerous problems associated with incrementally adjustable vehicle seat tracks and the locking mechanisms therefor, not the least of which is partial locking. Partial locking occurs when the teeth of the external locking means do not fully engage the apertures in the tracks on one or both of the inboard and outboard seat tracks. This problem is particularly acute in modern vehicle seating installations which utilize an integrated restraint system ("I.R.S."), where at least one anchor point for the passenger seat belts is attached to the seat assembly for adjustably sliding movement with the vehicle seat. I.R.S. arrangements typically require that both of the inboard and outboard seat tracks to be simultaneously fully locked under crash-like conditions, so as to safely handle the increased loading applied to the seat tracks by the seat belt attachments.

To ensure such simultaneous full locking, manually actuated, infinitely adjustable seat track locking mechanisms have recently found favour. These devices have no discrete teeth or detent members which engage slots in the seat track slides etc. Rather, infinitely adjustable seat track locking mechanisms typically use spring clutches or other devices to lock at any position upon release of the actuation mechanism by the user. Infinitely adjustable seat track locking mechanisms have found such favour despite their increased cost and complexity because they substantially solve the problem of partial locking discussed above, and offer more adjustment possibilities to the seat track designer, and ultimately the seat occupant. Also, generally speaking, infinitely adjustable seat track locking mechanisms are capable of providing for higher loading before failure under crash-like deceleration conditions, and substantially free up the interior space of the vehicle seat track slide to allow use of this space for other purposes (such as rollers or anti-rattle mechanisms).

One example of a recent infinitely adjustable locking mechanism is disclosed in U.S. Pat. No. 5,183,236 (Droulon), which patent is to a locking mechanism for rectilinear or circular displacement mechanical jacks. A mechanical jack is a broad term used in the Droulon patent to refer to a type of mechanism that has two co-operating members that are movable one with respect to the other, and that permits selective locking of the two members in chosen displacement one to the other.

In one embodiment of the Droulon patent, a casing is slidably mounted on a jack rod, which jack rod is part of the vehicle seat, for relative sliding movement of the casing along the jack rod. The casing is also operatively mounted in secure relation to the vehicle. A "V"-shaped pawl block is retained within the casing for movement between a locking position and an unlocking position, as will be described subsequently. The pawl block has a pair of inclined ramp surfaces that define a "V"-shaped cavity, which "V"-shaped cavity, together with an engagement surface on the rod, define a substantially triangular recess. A striated roller member is rotatedly mounted within the triangular recess for rolling contact with the engagement surface on the rod.

The Droulon pawl block has first and second sloped side surfaces that converge and join at a flat end surface. The first sloped side surface abuts against a co-operating corresponding sloped abutment surface on the casing. The second sloped side surface is in intimate supported contact with a rotatable generally round cam member, which rotatable cam member is also retained within the casing for movement between a blocking position and releasing position. In the blocking position, the cam member retains the pawl block in its locking position, and in the releasing position, the cam member retains the pawl block in its unlocking position. In either the locking or unlocking position of the pawl block, the pawl block is angularly pinched in unstable rockable relation between the generally round cam member and the sloped abutment surface of the casing.

The Droulon infinitely adjustable locking mechanism works in the following manner. In its locking position, the pawl block is wedged between the cam member and the sloped abutment surface of the casing, and is forced into its locking position whereat the striated roller is forced into intimate engagement with the engagement surface on the rod. The striated roller is trapped in centred relation within the triangular recessed defined by the engagement surface and the pawl block. When an accelerative or decelerative force is applied to the vehicle seat, the striated roller attempts to roll along the engagement surface of the rod; however, the striated roller becomes pinched between the rod and the respective inclined ramp surface of the pawl block. Accordingly, the striated roller cannot move along the rod, and thus the casing and the rod are locked with respect to each other.

In its unlocking position, the Droulon cam member is rotated so that the pawl block is not pushed into its locked position. A spring member biases the pawl block to its unlocking position, whereat the striated roller does not contact, or at least loosely contacts, the engagement surface on the rod. The casing and the rod may then be moved relative to one another. Once in a desired position, the cam member is returned to its blocking position at the pawl block is forced to its locking position, whereat the striated roller is again brought into locking engagement with the engagement surface of the rod, thus locking the casing and the rod with respect to each other.

While the Droulon device makes a definite improvement in the art, it has been found that the generally round cam member tends to act as a pivot point for the pawl block. Accordingly, there tends to be relative movement, and therefore looseness, between the pawl block and the sloped side surface, and also between the pawl block and the striated roller. This looseness between adjacent parts is known in the art as "chuck". The problem of chuck arises inherently in any mechanical vehicle seat locking device, and is the result of the clearances that are necessarily a part of any device containing mass-produced parts adapted to undergo relative movement. Chuck is a highly undesirable characteristic in automobile seat back hinges, for both safety and aesthetic reasons.

The Droulon mechanism exhibits a higher degree of chuck than is ideally desirable because a generally round cam member is used to control the positioning of the pawl block, which cam acts as a pivot point for the pawl block. This imparts a first source of chuck into the Droulon device. It can be seen that there is a second source of chuck imparted to the Droulon device on account of the clearances between the first sloped side surface of the pawl block and the co-operating, correspondingly sloped, abutment surface of the casing. There is a third source of chuck in relation to lost motion between the striated roller and the remaining components of the device. These three sources of chuck are highly undesirable, as they stack together to cause an overall looseness in the operation of the locking mechanism.

Another factor that affects the proper operation of the Droulon prior art locking mechanism is that it requires close manufacturing tolerances of the various parts that make up the locking mechanism. That is, if the parts have been manufactured slightly undersized, the striated roller may not properly engage the engaging surface on the rod, and resultingly, the locking mechanism may not lock the two co-operating elements with respect to each other. Conversely, if the parts have been manufactured slightly oversized, the locking mechanism may jam. The need for close manufacturing tolerances increases the cost and complexity of manufacture.

Another problem associated with the Droulon type of infinitely adjustable locking mechanism is the tendency of the various parts, such as the cam member, to physically wear after a period of time. Such wear causes increased looseness in the mechanism and accordingly, an even greater amount of chuck. In extreme circumstances, a significant amount of wear of the various parts could mean that the striated roller does not properly engage the engaging surface on the rod, thus perhaps precluding the locking mechanism from locking the two cooperating elements with respect to each other.

Another inherent problem with the Droulon mechanism is that it tends to lock better in one direction than in the other opposite direction. This directionality problem is overcome in the several illustrated embodiments by the inclusion of two "V"-shaped pawl blocks, each pawl block retaining a separate striated roller, and each pawl block abutting against opposed sloped sides of the casing. This solution introduces problems of increased degrees of chuck, increased overall size of the locking mechanism, increased complexity of manufacturing, and increased cost.

It is an object of the present invention to provide a mechanism for selectively locking in infinitely adjustable relation to each other, a stationary element and a co-operating movable element, wherein chuck is minimized.

It is an object of the present invention to provide a mechanism for selectively locking an infinitely adjustable relation to each other, a stationary element and a co-operating movable element, wherein relatively large tolerances in the size of the parts of the mechanism are within acceptable safety limits.

It is an object of the present invention to provide a mechanism for selectively locking an infinitely adjustable relation to each other a stationary element and a co-operating movable element, wherein wear of the parts of the mechanism is automatically accommodated.

It is an object of the present invention to provide a mechanism for selectively locking an infinitely adjustable relation to each other a stationary element and a co-operating movable element, which mechanism is relatively simple to manufacture.

It is an object of the present invention to provide a mechanism for selectively locking an infinitely adjustable relation to each other a stationary element and a co-operating movable element, which mechanism is relatively inexpensive to manufacture.

It is an object of the present invention to provide a mechanism for selectively locking an infinitely adjustable relation to each other a stationary element and a co-operating movable element, which mechanism is relatively small in size.

It is an object of the present invention to provide a mechanism for selectively locking an infinitely adjustable relation to each other a stationary element and a co-operating movable element, wherein the mechanism employs a single roller and locks equally well in opposite linear directions.

SUMMARY OF THE INVENTION

In accordance with the present invention there is provided a mechanism for selectively locking, in infinitely adjustable relation to each other, a stationary element and a movable element co-operatively mounted on the stationary element for movement in opposed first and second directions, the movable element having a generally planar engagement surface. The locking mechanism comprises: a casing rigidly mounted to the stationary element, the casing including a fixed abutment portion; a pawl block mounted within the casing and having a substantially "V"-shaped cavity defined by two ramp surfaces inversely inclined towards an apex of intersection; which inclined ramp surfaces, together with the engagement surface, define a substantially triangular recess. The pawl block is mounted within the casing, as aforesaid, so as to be slidably movable in opposite first and second linear directions along a first axis substantially transverse to the engagement surface, thereby to respectively increase and decrease the linear distance between the apex of intersection and the engagement surface. A striated roller member is operatively mounted on the casing, so as to be positioned within the substantially triangular recess for simultaneous circumferential engagement with the generally planar engagement surface and at least one of the inclined ramp surfaces, when the pawl block is moved in the first linear direction along the first axis to a locking configuration, and, for removal from such simultaneous circumferential engagement when the pawl block is moved in the second linear direction along the first axis to an unlocked configuration. A wedge block means, having a pawl block contacting surface and an abutment portion engagement surface, is also provided. The wedge block means is operatively mounted within the casing, so as to be movable in opposite third and fourth linear directions, along a second axis generally transverse to the first axis, respectively, between a blocking position, whereat the wedge block means is wedgingly engaged between a generally planar wedge-contacting surface positioned on the pawl block and the abutment portion of the casing so as to thereby urge the pawl block into the locking configuration, and a withdrawn position, whereat the wedge block is removed from the wedging engagement so as to permit movement of the pawl block from the locking configuration to the unlocked configuration, thereby to permit relative movement of the stationary and movable elements.

Other advantages, features and characteristics of the present invention, as well as methods of operation and functions of the related elements of the structure, and the combination of parts and economies of manufacture, will become more apparent upon consideration of the following detailed description and the appended claims, with reference to the accompanying drawings, the latter of which is briefly described hereinbelow.

DETAILED DESCRIPTION OF A PREFERRED EMBODIMENT

Figures 1, 2:
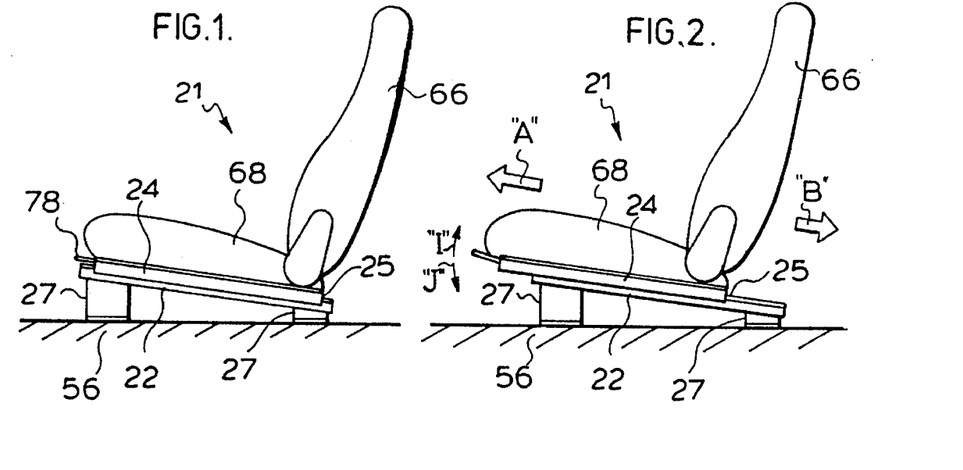
FIG. 1 is a side elevational view of a vehicle seat assembly mounted on the floor of a vehicle, with the vehicle seat assembly having a locking mechanism according to the present invention installed thereon, with the vehicle seat assembly being positioned in a generally central fore-aft position relative to the vehicle floor.
FIG. 2 is a side elevational view of the vehicle seat of FIG. 1, with the vehicle seat assembly being positioned in a generally forward fore-aft position relative to the vehicle floor.

Referring now to FIGS. 1 and 2 of the drawings, a vehicle seat assembly, as indicated by the general reference numeral 21, is shown mounted on the floor 56 of a vehicle (not shown), with the locking mechanism of the present invention, as indicated by the general reference numeral 20, installed thereon. The vehicle seat assembly 21 shown is one of two front "bucket" type seats of the vehicle, and, for reference purposes herein, will be assumed to be the driver's seat assembly of a typical left-hand drive vehicle.

FIG. 1 shows the vehicle seat assembly 21 in a generally central fore-aft position relative to the vehicle floor 56, which position would be a typical in-use position for an average sized passenger (not shown) seated in the vehicle seat assembly 21. FIG. 2 shows the vehicle seat assembly 21 after the locking mechanism 20 of the present invention has been unlocked, and the vehicle seat assembly 21 has been moved to a forward fore-aft position relative to the vehicle floor 56, which position would be used for a short legged passenger, or, for example, to facilitate ingress into and egress from, or general access to, the rear seat area of a two door vehicle.

Figure 3:
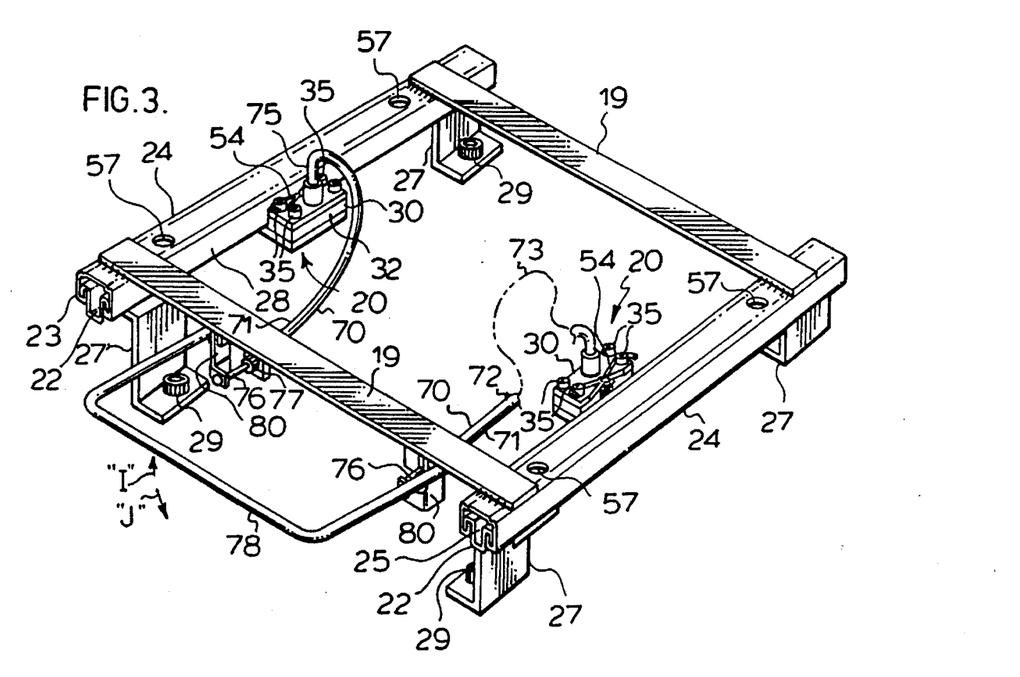
FIG. 3 is a perspective view of the vehicle seat track slides upon which the vehicle seat assembly of FIGS. 1 and 2 is mounted, with the locking mechanism of the present invention operatively installed on each of the inboard and outboard track slides.
Figures 4, 5:
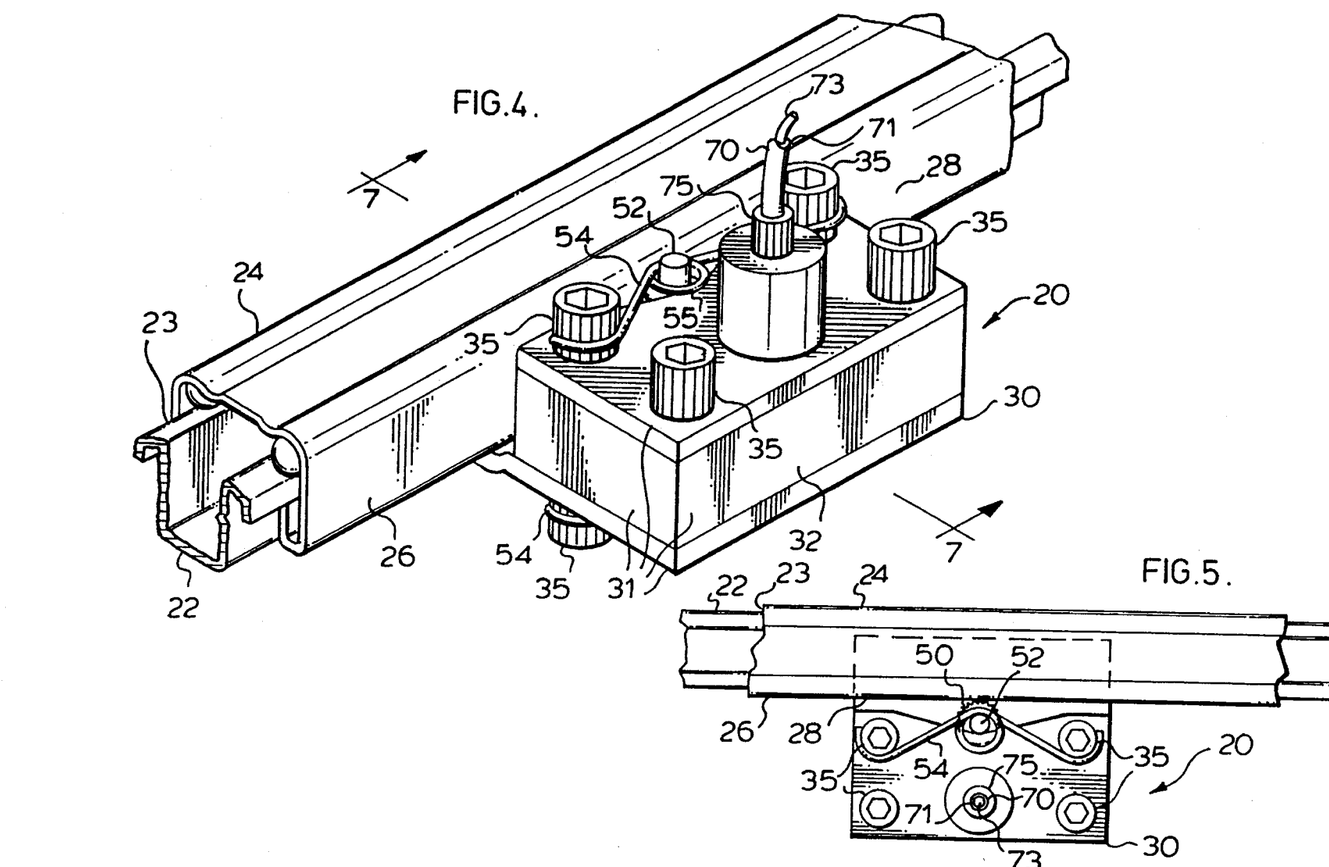
FIG. 4 is a substantially enlarged perspective view of one of the locking mechanisms of FIG. 3, installed on the inboard track slide.
FIG. 5 is a top plan view of the inboard track slide and the locking mechanism of FIG. 4.
Figure 6:
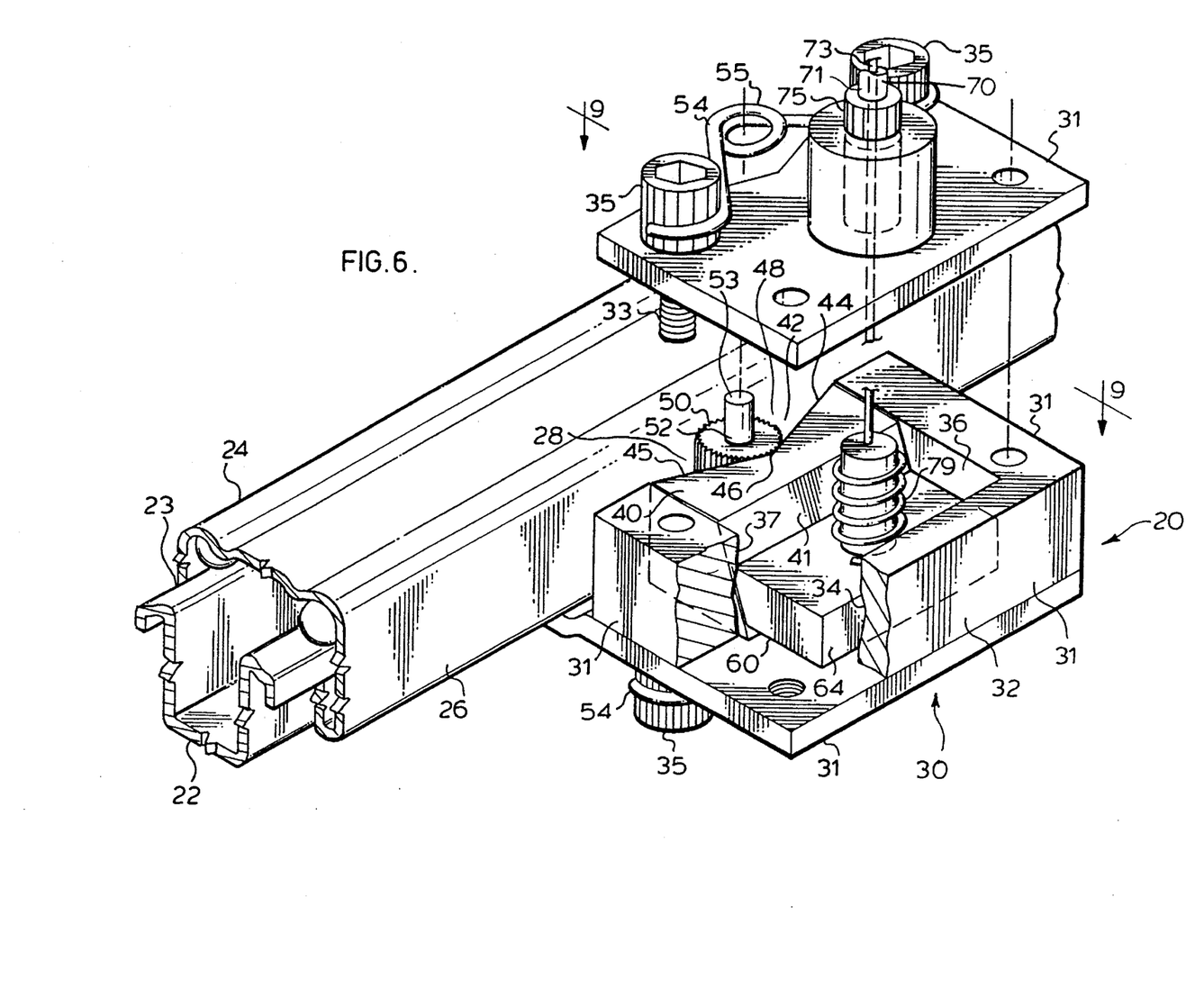
FIG. 6 is a substantially enlarged perspective view similar to FIG. 4, with the casing of the locking mechanism shown partially exploded and cut-away.

As can best be understood with reference to FIG. 3, the vehicle seat assembly 21 is adjustably mounted in the vehicle atop a pair of seat track slides 23,25. The inboard seat track slide is marked in the Figures with reference numeral 23, while the substantially identical outboard seat track slide is marked with reference numeral 25. Both of the inboard 23 and outboard 25 slides comprise a stationary vehicle seat track member 22 and a moveable vehicle seat track member 24, which stationary 22 and moveable 24 vehicle seat track members are co-operatively mounted one to the other in a conventional manner for sliding fore-aft movement of the moveable vehicle seat track member 24 with respect to the stationary vehicle seat track member 22 in opposed first and second directions, as indicated by arrows "A" and "B", respectively. The stationary track member 22 of each of the inboard 23 and outboard 25 track slides is secured to the vehicle floor 56 by way of front and rear leg members 27 and anchor bolts 29. The moveable track member 24 of each of track slides 23,25 may be connected to each other by way of a pair of bracing members 19, affixed to each of the moveable track members 24 as shown, by spot welding, or any other suitable affixation means.

Each of the movable track members 24 is itself bolted or otherwise rigidly affixed to the vehicle seat assembly 21 by means of bolts 58 extending through apertures 57 positioned adjacent opposite linear ends of the respective movable track members 24. The bolts 58 conventionally engage the frame structure (not shown) of the vehicle seat assembly 21. One locking mechanism 20, as will be subsequently described, is installed on the inboard seat track slide 23 and another substantially identical locking mechanism 20 is similarly installed on the outboard seat track slide 25, so as to each engage a generally planar engagement surface 28 positioned on an exterior surface 26 of the respective one of the moveable track members 24 of each slide 23,25.

Referring now to FIGS. 3 through 10 of the drawings, the locking mechanism 20 for selectively locking in infinitely adjustable relation to each other a stationary element, such as the stationary vehicle seat track member 22, and a moveable element, such as the moveable vehicle seat track member 24, is shown.

The operative components of the locking mechanism 20 are enclosed within a casing, generally designated by the reference numeral 30, which casing 30 is rigidly mounted to the stationary vehicle seat track member 22, externally of the stationary vehicle seat track member 22 and the moveable vehicle seat track member 24. It should be readily understood that the casing 30 could be equivalently mounted to the moveable vehicle seat track member 24, in which case the generally planar engagement surface 28 would correspondingly be positioned on the stationary vehicle seat track member 22.

The casing 30 has top 31a and bottom 31b wall members, two opposed side wall members 31c, and an end wall member 31d that acts as a fixed abutment portion 32. In the preferred embodiment shown in the Figures, the side wall members 31c and the end wall member 31d are formed as one integral piece, with each of the top 31a and bottom 31d wall members being separate plates. All of these various components of the casing 30 are removably secured together by four bolts 33. The abutment portion 32 is an integral part of the casing 30, and presents, internally of the casing 30, a substantially planar surface 34, as will be discussed subsequently in greater detail.

Figure 7:
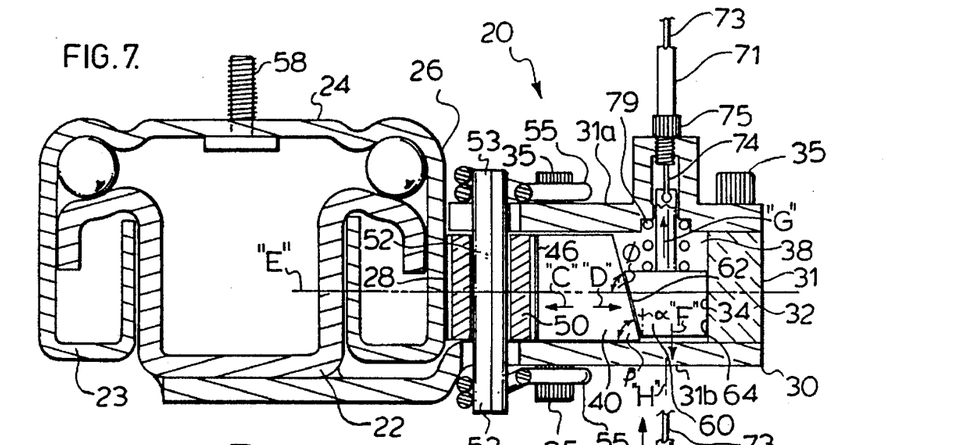
FIG. 7 is a cross-sectional end view of the inboard track slide and the locking mechanism, taken along section line 7—7 Of FIG. 4, with the wedge block means in its blocking position and the pawl block in its locking configuration.
Figure 8:
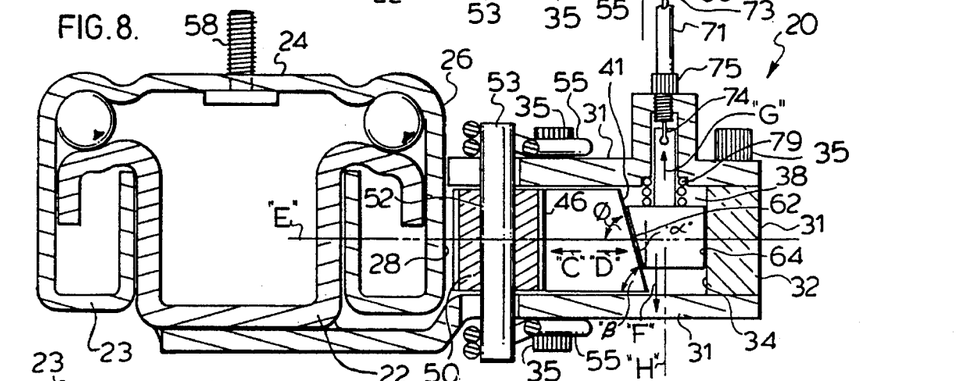
FIG. 8 is a sectional end view similar to FIG. 7, with the wedge block means in its withdrawn position and the pawl block in its unlocked configuration.
Figure 9:
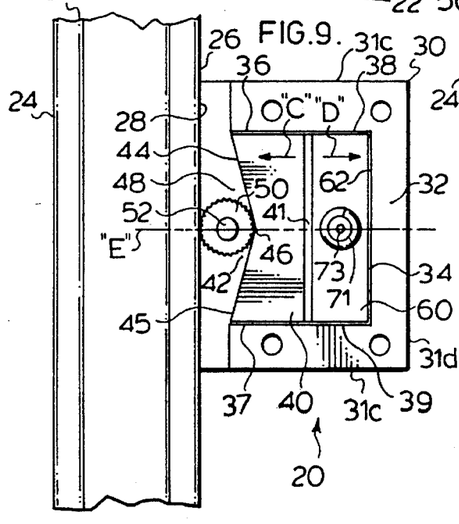
FIG. 9 is a reduced top plan view, partially in cross-section, taken along section line 9—9 of FIG. 7, showing the locking mechanism in its locked configuration; and, FIG. 10 is a top plan view, partially in cross-section, similar to FIG. 9, but with the striated roller shown in ghost outline in two positions corresponding to the locking configuration of the locking member, under the influence of significant accelerative and decelerative forces.
Figure 10:
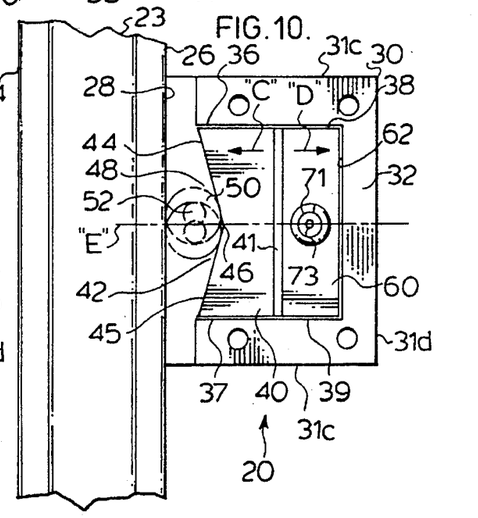

A pawl block 40, preferably constructed using powdered metal casting techniques to achieve close manufacturing tolerances, is slidably mounted within the casing 30 between two parallel inner guide surfaces 36 and 37 of the opposed casing side wall members 31c,31c. The pawl block 40 is slidably movable in opposite first "C" and second "D" linear directions along a first axis "E" which first axis "E" is substantially transverse to the generally planar engagement surface 28, between a locking configuration, as best seen in FIG. 7, and an unlocked configuration, as best seen in FIG. 8. Preferably, there is just enough clearance between the pawl block 40 and each of the two parallel inner guide surfaces 36 and 37 so that the pawl block 40 slides readily therebetween, but is not loose. Clearances in the order of 0.001" to 0.004" are desirably attainable in this regard.

The pawl block 40 has a substantially "V" shaped cavity 42 at one end thereof, and a substantially planar wedge-contacting surface 41 located on the opposite other end thereof. The substantially "V" shaped cavity 42 is defined by two ramp surfaces 44 and 45, which ramp surfaces 44 and 45 are inversely inclined towards an apex of intersection 46. The inclined ramp surfaces 44 and 45, together with the engagement surface 28, define a substantially triangular recess 48. Movement of the pawl block 40 along the first axis "E" in first direction "C" decreases the linear distance between the apex of intersection 46 of the two ramp surfaces 44 and 45 and the generally planar engagement surface 28 of the moveable vehicle seat track member 24, while movement of the pawl block 40 along the first axis "E" in the opposite second direction "D" increases this linear distance.

A striated roller member 50 is rotatably mounted on the casing 30 so as to be positioned within the substantially triangular recess 48, by means of a centrally disposed axle means 52. The axle means 52 is preferably held in centred relation to the apex of intersection 46 by a pair of torsion springs 54. The free ends 56 of each of the torsion springs 54 engage the casing 30 at the heads 35 of bolts 33. The central body portion 55 of each of the torsion springs 54 engages a respective opposite end 53 of the axle means 52. Thus, the two torsion springs 54 act as a biasing means so as to substantially center the striated roller 50 with respect to the apex of intersection 46 of the two inversely inclined ramp surfaces 44 and 45.

The striated roller 50 is further positioned within the substantially triangular recess 48 for simultaneous circumferential engagement with the generally planar engagement surface 28 of the moveable vehicle seat track member 24 and at least one of the inclined ramp surfaces 44 and 45 when the pawl block 40 is moved in a first linear direction "C" along the first axis "E" to a locking configuration. The striated roller member 50 is further positioned within the substantially triangular recess 48 for removal from aforesaid simultaneous circumferential engagement when the pawl block 40 is moved in a second linear direction "D" along the first axis "E" to an unlocked configuration, as best seen in FIG. 8.

A wedge block means 60 is situated between the pawl block 40 and the substantially planar surface 34 of the abutment portion 32. A substantially planar pawl-contacting surface 62 on the wedge block means 60 operatively contacts the substantially planar wedge-contacting surface 41 on the pawl block 40. The wedge block means 60 also has an abutment portion engagement surface 64, located at its opposed other end to the pawl-contacting surface 62, which abutment portion engagement surface 64 is adapted to contact the substantially planar surface 34 of the abutment portion 32 in force transmitting relation, relative to axis "E".

The wedge block means 60 is also preferably constructed using powdered metal casting techniques to achieve close manufacturing tolerances, and is slidably mounted with respect to the casing 30 between two parallel guide surfaces 38 and 39, (which are the innermost surfaces of the opposed side wall members 31c of the casing 30) so as to be movable in opposite third "F" and fourth "G" linear directions along a second axis "H", which second axis is generally transverse to the first axis "E". Preferably, there is just enough clearance between the wedge block means 60 and each of the two parallel inner guide surfaces 38 and 39, so that the wedge block means 60 slides readily therebetween, but is not loose. Clearances in the order of 0.001" to 0.0004" are desirably attainable in this regard. The wedge block means 60 is movable between a blocking position, as is best seen in FIG. 7, and a withdrawn position, as best seen in FIG. 8. In the blocking position, the wedge block means 60 is wedgingly engaged between the substantially planar wedge-contacting surface 41 and the substantially planar surface 34 of the abutment portion 32, so as to thereby urge the pawl block 40 to its locking configuration.

In the withdrawn position, the wedge block means 60 is sufficiently removed from aforesaid wedging engagement between the pawl block 40 and the abutment surface 32, so as to permit movement of the pawl block 40 from its locking configuration to its unlocked configuration, thereby to permit relative movement of the stationary vehicle seat track member 22 and the moveable vehicle seat track member 24.

The pawl-contacting surface 62 is inclined with respect to the second axis "H" at an acute angle "$\alpha$", (see FIG. 7) which angle "$\alpha$" is greater than 0°, and less than about 45°, depending on the co-efficient of friction of the materials of the wedge-contacting surface 41 and the pawl contacting surface 62. It has been found that an angle of about 20° is preferable for this application, where powdered metal components are used as indicated above. In the preferred embodiment shown, the pawl-contacting surface 62 is preferably also inclined with respect to the first axis "E" at an acute angle "$\phi$", but may be oriented transversely to the first axis "E".

The wedge-contacting surface 41 is inclined with respect to the second axis "H" at an obtuse angle of incline "$\beta$" that is complementary to the angle of incline of the pawl-contacting surface 62, such that the wedge-contacting surface 41 is also inclined with respect to the second axis "H" at an angle parallel to the pawl-contacting surface 62. The pawl-contacting surface 62 of the wedge block means 60 and the wedge-contacting surface 41 of the pawl block 40 are thereby caused to operatively engage each other in flat surface-to-surface stable contact, thus precluding unwanted relative movement, and therefore, any significant "chuck", between the pawl block 40 and the wedge block means 60.

Preferably, the substantially planar surface 34 of the abutment portion 32 is substantially perpendicular with respect to the first axis "E". In this manner, any forces that are transmitted through the pawl block 40, and therefore along the direction of first axis "E", and through the wedge block means 60 to the abutment portion 40, would produce a reaction force at the substantially planar surface 34, which reaction force is oppositely directed parallel to the first axis "E". Thus, there is no component of the reaction force that acts in the fourth linear direction "G", as with prior art devices utilizing a rotary cam. A reaction force having a component that acts in the fourth linear direction "G" would cause the wedge block means 60 to be biased in the fourth linear direction "G" towards its withdrawn position. Such biasing of the wedge block means 60 in the fourth linear direction is highly undesirable, as it would tend to remove the wedge block means 60 from contact with the pawl block means 40. Accordingly, the pawl block 40 would tend to be moved away from its locking configuration.

The wedge-contacting surface 41 and the substantially planar surface 34 of the abutment portion 32 are generally opposed one to the other, and are angled with respect to each other so as to form a wedge shape, to thereby accommodate the wedge block means 60 in flat surface-to-surface stable contact between the pawl-contacting surface 62 and the wedge-contacting surface 41, and also between the abutment portion engagement surface 64 and the substantially planar surface 34 of the abutment portion 32. The substantially planar surface 34 of the abutment portion 32 and the wedge-contacting surface 41 converge with respect to each other in the third linear direction "F", so as to accommodate the shape of the wedge block means 60.

An actuation means, as indicated by the general reference numeral 70, is operatively connected to the wedge block means 60 to provide for selective movement of the wedge block means 60 in its third "F" and fourth "G" linear directions. The actuation means 70 comprises a sheathed cable 72, having a cable member 73 operatively attached at its one end 74 to the wedge block means 60, as can be best seen in FIGS. 7 and 8, and operatively attached at its opposite other end 76 to a handle means 78, as can best be seen in FIG. 3. The sheath 71 is threadibly engaged at one end 75 to the casing 30, and is threadibly engaged at its opposite other end 77 to a retaining bracket 80 attached to one of the bracing members 19 of the vehicle seat assembly 21, so as to permit adjustability of the tightness of the cable 73. Pulling on the cable member 73, moves the wedge block means 60 from its blocking position towards its withdrawn position against the biasing force of the first biasing means being coil spring 79, which coil spring is positioned as shown within the casing.

In use, a user manipulates the handle means 78 by lifting the handle means 78 in the direction indicated by arrow "I" (see FIG. 3), which lifting of the handle means 78 correspondingly pulls the cable means 73 of the sheathed cable 72, such that the wedge block means 60 is moved in the fourth linear direction "G" towards its withdrawn position, against the biasing force of the first biasing means coil spring 79. The wedge block means 60 is, accordingly, removed from wedging engagement between the pawl block 40 and the abutment portion 32 of the case 30, so as to permit movement of the pawl block 40 from its locking configuration to its unlocked configuration. In the unlocked configuration of the pawl block 40, the linear distance between the apex of intersection 46 of the two ramp surfaces 44 and 45 and the engagement surface 45 is increased, to thereby remove the striated roller member 50 from simultaneous circumferential engagement with the generally planar engagement surface 28 and at least one of the inclined ramp surfaces 44 and 45. In the preferred embodiment illustrated, the torsion springs 54 bias the striated roller member 50 towards the apex of intersection 46 of the two ramp surfaces 44 and 45 (so as to prevent creep of the striated roller member 50), and the striated roller member 50 is accordingly, removed from circumferential engagement with the generally planar engagement surface 28. Resultingly, the generally planar engagement surface 28 may be moved with respect to the locking mechanism 20, thereby to permit relative movement of the stationary vehicle seat track member 22 and the moveable vehicle seat track member 24. Such relative movement of the stationary vehicle seat track member 22 and the moveable vehicle seat track member 24 corresponds to relative sliding movement of the vehicle seat assembly 21 between its various fore-aft positions.

When the vehicle seat assembly 21 has reached a desired fore-aft position, the user releases the handle means 78, which handle means 78 travels in the direction of arrow "J" to a rest position, as caused by the first biasing means coil spring 79, and as assisted by gravity. Accordingly, the wedge block means 60 is caused to move in the third linear direction "F" from its withdrawn position to its blocking position. During this movement of the wedge block means 60 from its withdrawn position to its blocking position, the pawl-contacting surface 62 slides along the wedge-contacting surface 41 of the pawl block 40, thus causing the pawl block 40 to move towards its locking configuration. The pawl-contacting surface 62 of the wedge block means 60 and the wedge-contacting surface 41 of the pawl block 40 remain in flat surface-to-surface stable contact one with the other during the movement of the pawl block means 60 from its withdrawn to its blocking position. In its blocking position, the pawl block 40 causes the striated roller member 50 to be in simultaneous circumferential engagement with the generally planar engagement surface 28 and at least one of the inclined ramp surfaces 44 and 45 to thereby preclude relative movement of the stationary vehicle seat track member 22 and the moveable vehicle seat track member 24.

In the event of acceleration or deceleration of the vehicle having the vehicle seat assembly 21 therein, the corresponding rearwardly or forwardly directed force of inertia or momentum, as the case may be, of the vehicle seat assembly 21 is transferred through the moveable element 24 to the striated roller member 50, which striated roller member 50 is pinched between the generally planar engagement surface 28 and the respective of the two ramp surfaces 44 and 45, depending on the direction of the force. The force from the striated roller member 50 is transmitted to the respective one of the two ramp surfaces 44 and 45. Due to the sloped orientation of the ramped surfaces 44 and 45, a portion of the force is transmitted through the pawl block 40 to the respective of the inner guide surfaces 36 and 37, and to the stationary vehicle seat track member 22, and the remaining portion of the force is transmitted through the pawl block 40 to the wedge block means 60 and ultimately to the casing 30 at the abutment portion 32 thereof. The flat surface-to-surface stable contact between the wedge-contacting surface 41 of the pawl block 40 and the pawl-contacting surface 62 of the wedge block means 60 ensures that there is no significant relative movement, and therefore no looseness or "chuck", between the wedge block means 60 and the pawl block 40, unlike prior art devices utilizing cams.

It will be understood that numerous variations as will occur to those skilled in the art may be made to the above-described apparatus without departing from the claimed scope of the invention. For example, in an alternative embodiment of the present invention (not shown), it is envisioned that the wedge-contacting surface 41 could be oriented generally perpendicularly to the first axis "E" and that the substantially planar surface 34 of the abutment portion 32 could be inclined with respect to the first axis "E".

The wedge-contacting surface 41 and the substantially planar surface 34 of the abutment portion 32 would remain generally opposed one to the other, and would be angled with respect to each other so as to form a wedge shape, to thereby accommodate the wedge block means 60 in flat surface-to-surface stable contact between the pawl-contacting surface 62 and the wedge-contacting surface 41 and also between the abutment portion engagement surface 64 and the substantially planar surface 34 of the abutment portion 32.

In a further alternative embodiment of the present invention (not shown), it is envisioned that the stationary element and the moveable element could be pivotally attached one to the other, such as in a vehicle seat hinge, with the generally planar engagement surface essentially forming a curved plane coincident with a radius centered on the point of pivotal attachment of the stationary and pivotal elements. In yet a further variant of this alternative embodiment (not shown) the movable element could be a control rod passing through the casing, which control rod translates the pivotal movement of the seatback portion 66 of the seat assembly 21 via a bell crank lever on the seatback portion 66 to a corresponding linear movement, which linear movement is adjustably controlled by the locking mechanism according to the invention positioned on the seat cushion portion 68 of the seat assembly 21, which seat cushion portion 68 constitutes the stationary element.

Various other embodiments of the present invention also fall within the spirit and scope of the present invention, which is limited only by the claims presented herewith.

I claim:

1. A mechanism for selectively locking, in infinitely adjustable relation to each other, a stationary element and a movable element co-operatively mounted on said stationary element for movement in opposed first and second directions, said movable element having a generally planar engagement surface, said locking mechanism comprising:

a casing rigidly mounted to said stationary element, said casing including a fixed abutment portion;

a pawl block mounted within the casing and having a substantially "V"-shaped cavity defined by two ramp surfaces inversely inclined towards an apex of intersection, which inclined ramp surfaces, together with said engagement surface, define a substantially triangular recess, said pawl block being slidably mounted with respect to said casing, so as to be slidably movable in opposite first and second linear directions along a first axis substantially transverse to said engagement surface, thereby to respectively increase and decrease the linear distance between the apex of intersection and said engagement surface;

a striated roller member operatively mounted on the casing so as to be positioned within said substantially triangular recess for simultaneous circumferential engagement with said generally planar engagement surface and at least one of said inclined ramp surfaces when said pawl block is moved in said first linear direction along said first axis to a locking configuration, and for removal from said simultaneous circumferential engagement when said pawl block is moved in said second linear direction along said first axis to an unlocked configuration; and, a wedge block means having a substantially planar pawl-contacting surface and an abutment portion engagement surface, said wedge block means slidably mounted with respect to said casing so as to be movable in opposite third and fourth linear directions along a second axis generally transverse to said first axis, respectively between a blocking position, whereat said wedge block means is wedgingly engaged between a substantially planar wedge-contacting surface located on said pawl block and said abutment portion of said casing so as to thereby urge said pawl block into said locking configuration, and a withdrawn position, whereat said wedge block is removed from said wedging engagement so as to permit movement of said pawl block from said locking configuration to said unlocked configuration, thereby to permit relative movement of said stationary and movable elements; and, an actuation means operatively connected to said wedge block means to provide for selective movement of said wedge block means in said third and fourth linear directions.

2. The locking mechanism of claim 1, wherein said pawl-contacting surface is inclined with respect to said first axis.

3. The locking mechanism of claim 2, wherein said pawl-contacting surface is inclined with respect to said second axis at an angle of between 0° and 45°.

4. The locking mechanism of claim 3, wherein said wedge-contacting surface is inclined with respect to said second axis at an obtuse angle of incline complementary to the angle of incline of said pawl-contacting surface, such that said wedge-contacting surface is also inclined with respect to said second axis at an angle parallel to said pawl-contacting surface, thereby to operatively engage said pawl-contacting surface in flat surface-to-surface stable contact.

5. The locking mechanism of claim 4, wherein said pawl block is slidably mounted as aforesaid between two parallel inner guide surfaces of said casing for said movement in said opposite first and second linear directions along said first axis.

6. The locking mechanism of claim 5, wherein said actuation means comprises a first biasing means mounted on said casing so as to bias said wedge block means in said third linear direction towards said blocking position.

7. The locking mechanism of claim 6, wherein said abutment portion comprises a substantially planar surface.

8. The locking mechanism of claim 7, wherein said abutment portion is an integral part of said casing.

9. The locking mechanism of claim 8, wherein said wedge-contacting surface and said substantially planar surface of said abutment portion are generally opposed one to the other and converge with respect to each other in said third linear direction.

10. The locking mechanism of claim 9, wherein said substantially planar surface of said abutment portion is generally perpendicular with respect to said first axis.

11. The locking mechanism of claim 10, wherein said striated roller member is rotatably mounted on said casing by means of a centrally disposed axle means.

12. The locking mechanism of claim 11, wherein a second biasing means is operatively mounted between the casing and the axle means, so as to substantially centre said striated roller member with respect to said apex of intersection of said two inversely inclined ramp surfaces.

13. The locking mechanism of claim 12, wherein said second biasing means comprises a pair of torsion springs, with the free ends of each of said torsion springs engaging said casing and the central body portion of each of said torsion springs engaging a respective opposite end of said axle means.

14. The locking mechanism of claim 6, wherein said actuation means further comprises a sheathed cable operatively attached at its one end to said wedge block means and operatively attached at its opposite other end to a handle means, so as to move said wedge block means in said fourth linear direction toward said withdrawn position against the biasing of said first biasing means upon manipulation by said user.

15. The locking mechanism of claim 1, wherein said stationary element and a movable element each comprise cooperating vehicle seat track members.

16. The locking mechanism of claim 15, wherein said casing is mounted externally of said vehicle seat track members.

17. The locking mechanism of claim 16, wherein said generally planar engagement surface is on an exterior surface of said stationary element.

* * * * *